May 6, 1958 R. DRESSLER 2,833,959

COLOR TELEVISION VOLTAGE CONTROL SYSTEM

Filed July 6, 1954 3 Sheets-Sheet 1

INVENTOR.
ROBERT DRESSLER
BY Darby & Darby
ATTORNEYS

May 6, 1958 R. DRESSLER 2,833,959

COLOR TELEVISION VOLTAGE CONTROL SYSTEM

Filed July 6, 1954 3 Sheets-Sheet 2

INVENTOR.
ROBERT DRESSLER
BY
Darby & Darby
ATTORNEYS

INVENTOR.
ROBERT DRESSLER
BY
Darby & Darby
ATTORNEYS

United States Patent Office 2,833,959

Patented May 6, 1958

2,833,959

COLOR TELEVISION VOLTAGE CONTROL SYSTEM

Robert Dressler, Elmont, N. Y., assignor to Chromatic Television Laboratories, Inc., New York, N. Y., a corporation of California Application July 6, 1954, Serial No. 441,367

12 Claims. (Cl. 315—21)

This invention relates to color television and particularly to the control of voltages for color presentation. This application is a continuation-in-part of my prior application Serial No. 227,985, filed May 24, 1951, now abandoned.

In a copending application of Dr. Ernest O. Lawrence, Serial No. 150,732, there is described one type of cathode ray tube structure for presenting color images for television. In the structure therein described and claimed, the face of the cathode ray tube is coated with a phosphor which fluoresces in a single desired color, such as for instance red. Adjacent to the face of the tube and in the path of the electron beam, there is a grating having plates extending longitudinally for a short distance with alternate plates bearing phosphors which fluoresce in other colors such for example as green and blue respectively. As the electron beam approaches the screen, voltages applied to the grating deflect the beam either to a green phosphor or to a blue phosphor plate. If no deflecting voltage is applied to the grating the beam proceeds to the face of the cathode ray tube and excites the red phosphor. The tube thus is adaptable to present color television images following any of the currently advocated system involving dot, line or field sequential color.

Another type of cathode ray tube structure adapted for presenting color images for television is that which popularly has been identified as the post deflection focussing tube. In this tube the screen comprises strips or stripes of fluorescent material which fluoresce in different colors. The pattern may for example be a stripe of red fluorescent material, one of green material, one of blue and another one of green and then a repetition of the foregoing. A grid of closely spaced wires is supported on a frame longitudinally adjacent the screen, these wires extending parallel to the stripes of color material and being spaced from the screen in the direction of the electron gun. Alternate wires are connected together, the wires being in respective electron optical alignment with the said stripes of fluorescent material. The grid therefore may be in two electrical sections with the wires of one section being in electron optical alignment with the stripes which, when excited, fluoresce in red, for instance, while the wires of the other section are in electron optical alignment with the stripes which, when excited, fluoresce in blue. These color arrangements may of course be varied at will and are identified positionally herein merely for illustrative purposes. Additionally, a conductive backing is placed over all the phosphors and a terminal brought out from this conductive layer. A focussing accelerating potential is applied between the electrical center of the wire grid and the coating thus forming a series of converging cylindrical electrode lenses at the screen end of the tube.

As a result of the structure described electrons travelling from an electron gun perpendicular to the tube face are focussed by the series of electrostatic lenses and strike, for example, the green strips at times when there is zero potential betwen the red and blue terminals of the wire grid. By applying a predetermined potential difference between the sets of wires in the grid structure in one direction the beam will be caused to strike, in the example, a red fluorescent material and conversely by applying a potential difference between the sets of wires in the opposite direction the electron beam will be caused to strike a blue fluorescent material.

The post deflection focussing cathode ray tube above briefly described may be provided with three electron guns instead of the single one mentioned, but for use with the voltage control system here considered the single gun tube is preferred.

The type of tube first described above, i. e., the one having the phosphor-bearing grating or plates, may be referred to herein as the grating type tube. The other type tube, i. e., the so-called P. D. F. tube having the wire grid type of deflecting elements, may be referred to herein as the wire grid or grid type of tube.

Each type tube above mentioned is adapted to present color television images utilizing any of the systems involving dot, line or field sequential color.

To prevent color contamination when using either of the two tubes briefly described above, it is desirable that the electron beam excite only one of the three fluorescent materials or phosphors at any one instant. Accordingly, it is among the objects of this invention to provide new circuit arrangements for controlling the voltages for tubes of the types described; to provide a circuit for producing voltages to be applied to the grid to attract the beam to the phosphor of a given color, and to prevent the beam from striking phosphors of other colors; to provide a circuit to produce voltages which will create a positive or attracting potential on one set of plates or grid wires while simultaneously creating a relative negative voltage on the adjacent plate or grid wire; and to provide a circuit for producing voltages which will reduce the potential on the grating containing the blue and green phosphors in the grating type tube i. e., having the phosphor-bearing grating while allowing full accelerating potential to be applied for excitation of the red phosphor on the screen of the tube.

Other objects will be apparent to those skilled in the art after a study of the following description, claims and drawing in which, Figure 1 shows the time and sequence of typical color presentation, in field sequential color transmission, together with typical waveforms generated in the receiver for controlling such color presentation;

The invention described herein is applicable to both of the said type tubes described above. The principles of the invention may be applied equally as well to either type tube. In the claims, the words "deflection elements" or "grid" may be used, and as so used are intended to cover the elements or grid structures comprising either of the two type tubes described above, or any structure of equivalent scope.

As has been mentioned above, the tubes briefly described are applicable to the various types of color television presentation. The invention will, however, be described herein for illustrative purposes as applied to field sequential operation.

Figure 1:
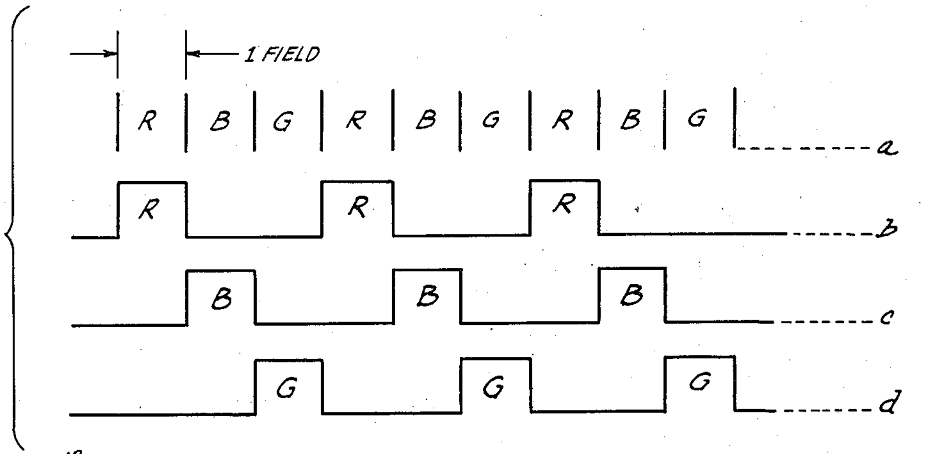

In operation of either of the tube types in a field sequential system square wave voltages are generated for each of the three colors sequentially. The generation of such voltages is triggered for synchronization by the signal received as part of the television transmission. The synchronization pulses control scanning of the cathode ray beam at field frequency in the television picture tube. If the order of presentation of color in sequential fields is red, blue and green, as shown in line *a* of Figure 1, the sync signal for the first field triggers the generation of the first square wave pulse, illustrated in line *b*, for presenting the red color field by excitation of the red phosphor. The square wave voltage continues for the period of one field at which point the next sync pulse initiating the second field triggers the generation of a square wave pulse shown in line *c* to excite the blue phosphor for blue presentation. The following or third field is initiated by the next field sync pulse and the same triggering principles provide the square wave voltage shown in line *d* for activation of the plates bearing the green phosphor. The following field is a representation of red and the presentation of color continues in this order.

The color producing phosphors as used on either of the type tubes referred to herein may be in strips or stripes of consecutive colors, such as red, green, blue, red, green, blue, etc., or the stripes may have a predominance of one color as compared to the other two, wherein such stripes might be in the order, for instance, as red, green, blue, green, red, green, blue, green, etc. As pointed out previously, the selection and arrangement of colors may be varied and the invention herein is applicable to any such choice.

In the transmission of color images, phasing pulses may be required for best reproduction of the image. Any known system may be used and any one of the fields such for example as the red field may be triggered by a suitable phasing pulse to initiate the sequence of color presentation.

Figure 2:
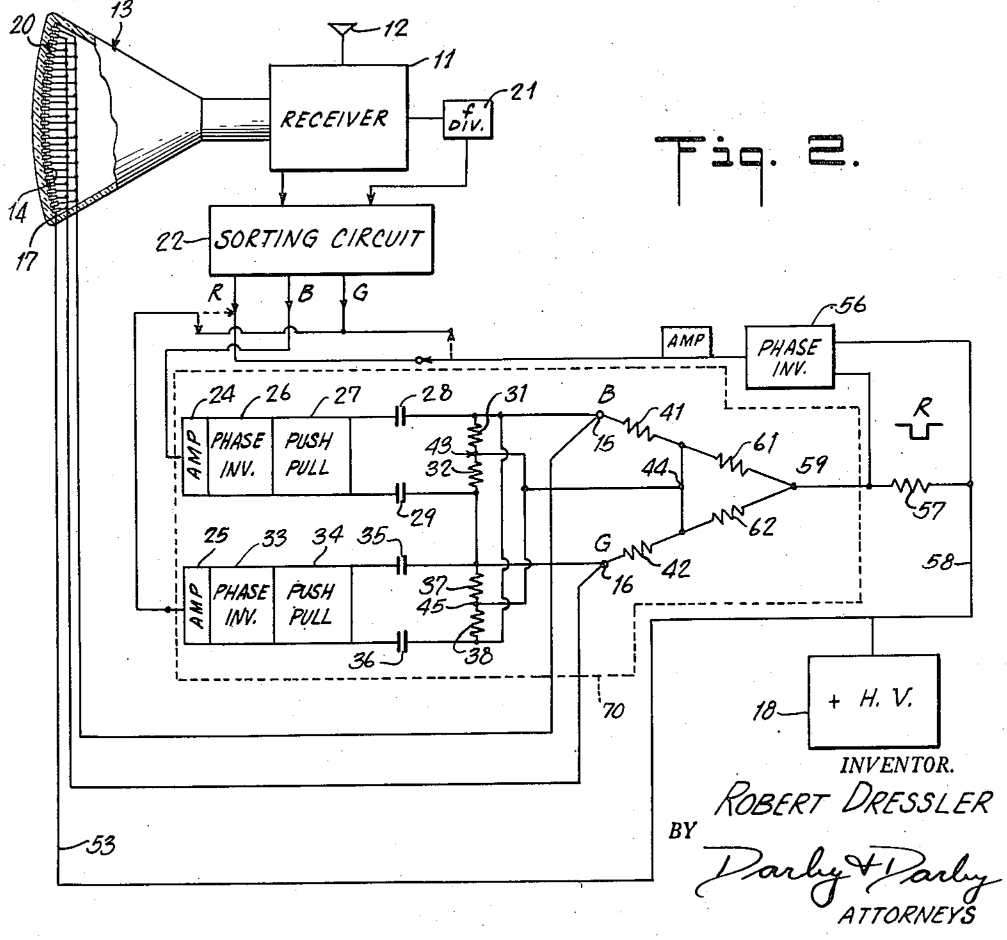
Figure 2 is an electrical diagram partly in block form and partly in schematic form showing the electronic circuit connections in accordance with the invention to be used in a television receiver with a cathode ray tube of the grating type.

Referring now to Figure 2, a receiver 11 of a well known type satisfactory for receiving color television signals through an antenna 12 reproduces such signals on a cathode ray tube 13 of the grating type. This tube may have a red phosphor on the face 14 and an internal grating 20 in which alternate plates bearing a blue phosphor are connected to a terminal 15 while the other plates bearing a green phosphor are connected to a terminal 16. These plates have a potential approximating that of the second anode of the electron gun.

A high potential or accelerating voltage may be applied to a terminal 17 from a source 18 the terminal 17 being connected to a conductive coating on the red phosphor. Other connections in the receiver and to the cathode ray tube for presenting the image are made in accordance with well known principles.

For convenience, phosphors which when activated fluoresce in red, green or blue as the case may be, will be referred to hereinafter as the red, green or blue phosphor. Likewise plates in the grating 20 bearing such phosphors will be referred to as the green or blue plates and picture fields will be referred to by their respective color presentations.

The vertical synchronizing pulses from the receiver 11 occurring at field frequency are applied to a sorting circuit 22. The sorting circuit 22 utilizing the pulses fed thereto by the receiver 11 produces three sets of square wave pulses, each pulse having a duration equal to that of a television color field. The pulses in each set occur at a rate equal to one-third of the field frequency and the combined pulses from the three sets occur sequentially.

The pulse output from the receiver 11 fed to the sorting circuit 22 comprises the color phasing pulse occurring at one-third the field frequency or rate and the three sets of square wave pulses occurring sequentially as described above. If, as sometimes occurs, no color phasing pulse is transmitted, then a frequency dividing circuit 21 may be used to provide the set of pulses occurring at one-third of the field frequency rate. Such a circuit, in itself well known, need be used only if the color phasing pulses are not being transmitted.

In accordance with this invention the voltages for the blue and green color presentations thus derived are fed in a phase inverted relationship to the terminals 15 and 16, respectively, for the corresponding color plates in the grating 20. Thus, while the potential on the blue plate, for instance, is positive, the potential on the adjacent green plate is correspondingly negative with respect to initial or second anode potential.

The square wave output from the sorting circuit 22, corresponding to the blue field is fed to amplifier 24, phase inverter 26, circuit 27, through capacitors 28 and 29 to center tapped resistors 31, 32 (which may be a pair of matched units) and to terminal 15 connected to the blue plates of the grating 20.

The output corresponding to the green field is fed from the sorting circuit 22 to amplifier 25, phase inverter 33, push-pull circuit 34 and applied through capacitors 35 and 36 to center tapped resistors 37 and 38 (which may be a pair of matched units) and then to terminal 16 connected to the green plates of the grating 20.

The center taps 43 and 45 of resistors 31, 32 and resistors 37, 38 respectively are connected together at a terminal 44. The blue terminal 15 and green terminal 16 are connected to center terminal 44 through resistor 41 and resistor 42 respectively.

The resistance network is completed by connecting the low end of resistor 32 to the high end of resistor 37, and the low end of resistor 38 to the high end of resistor 31.

In operation, when the voltage for the blue plates is applied to the blue terminal it is simultaneously applied in inverse polarity to the green plates. Thus the blue plate will be driven positive to attract the electron beam and the adjacent green plate driven negative to prevent any attraction of the electron beam thereto. During the next field the voltage is applied to create a positive potential on the green plate terminal 16 and a corresponding potential of opposite or negative polarity on the blue plate terminal 15. By virtue of this voltage relationship the electron beam is attracted entirely to the green phosphors thereon and the negative potential on the adjacent blue plates prevents attraction of the electron beam to those plates and thus prevents excitation of the blue phosphor resulting from stray electrons impinging upon the blue plates. In this way color contamination is materially reduced or eliminated since the electron beam strikes only the desired phosphors during each cycle.

The invention as thus far described prevents contamination by applying voltages of desired polarity to the green and blue terminals of the grating type tube. It is often desirable to simultaneously reduce the possibility of excitation of the undesired color phosphors on the grating 20 during presentation of the color represented by the phosphor on the tube screen 14. This may be accomdescribed herein equal control voltage pulses of opposite polarity are applied simultaneously to adjacent elements in the deflecting grid structure. This is to be distinguished from the prior art in which there merely has been applied to these deflecting elements a difference in potential. This distinction, however, is extremely important. It is essential that the deflecting grid in the tube be maintained at a constant average voltage. Any variation in this average voltage of the grid affects the acceleration voltage and deflection sensitivity. Any change in sensitivity affects color fringing, i. e., produces color contamination, because of lack of control of deflection of all of the electron beam. A balanced voltage, on the other hand, maintains the sensitivity. In order, therefore, that the necessary potential be applied between the adjacent elements of the deflecting grid, while yet maintaining the entire grid at its constant average potential, it is necessary that, as disclosed herein, the voltages be applied simultaneously and equally to adjacent elements and in respective opposite polarity.

The first series of pulses thus applied result in uniform and accurate deflection of the cathode ray beam to produce excitation of phosphors of the desired color. A second series or set of pulses may then be applied sequentially with respect to the first series so as to switch the beam from the phosphors of one color to that of another. The second series or set of pulses, like the first, are of equal but opposite polarity with respect to each other. They are, however, of opposite polarity with respect to the first of said set of pulses. Throughout all of such switching, however, the grid maintains its constant average potential.

While preferred embodiments of the invention have been described, it will be apparent that modifications, particularly of circuit details, may be made without departing from the scope as defined in the following claims.

What is claimed is:

1. In a color television system a cathode ray tube having a screen and two sets of electron deflecting elements positioned longitudinaly adjacent the screen thereof, a generator of periodic pulses of control voltage, a phase inverter circuit, said generator being connected to said phase inverter circuit and to said sets of elements to apply a positive voltage pulse on the first of said sets of elements and a substantially equal but negative voltage pulse on the second of said sets of elements, a second generator of periodic pulses of control voltage and a second phase inverter circuit, said second generator being connected to said second phase inverter circuit and to said sets of elements to apply a negative voltage pulse to the first of said sets of elements and a substantially equal but positive voltage pulse to the second of said sets of elements, said pulses from the first generator and said second generator occurring sequentially.

2. In a color television system a cathode ray tube having a screen and two sets of electron deflecting elements positioned longitudinally adjacent the screen thereof, a generator of periodic pulses of control voltage, a phase inverter circuit, said generator being connected to said phase inverter circuit and to said sets of elements to apply a positive voltage pulse on the first of said sets of elements and a substantially equal but negative voltage pulse on the second of said sets of elements, said tube having a high potential accelerating electrode and said generator being connected to said electrode to apply a voltage pulse of negative polarity thereto.

3. In a color television system a cathode ray tube having a screen and two sets of electron deflecting elements positioned longitudinally adjacent said screen, a first source of periodic pulses of control voltage and a second source of periodic pulses of control voltage, said first source being connected to said element to apply pulses of substantially equal voltage to said sets of elements in respective opposite phase, said second source being connected to said elements to apply pulses of substantially equal voltage to said sets of elements in respective opposite phase, the pulses from said second source occurring sequentially with those of said first source and of opposite polarity to the pulses of said first source.

4. The apparatus of claim 1 including a third generator of periodic pulses of voltage connected to said deflecting elements to apply a voltage pulse of negative polarity thereto, the voltage pulse of said third source occurring sequentially with the pulses of said first and said second sources.

5. In a color television system a cathode ray tube having a grid of deflecting elements positioned longitudinally adjacent the screen thereof and an accelerating electrode, a source of voltage connected to said electrode, a generator of periodic pulses of control voltage connected to said grid and said electrode to apply periodically a pulse of positive polarity to said grid and a pulse of negative polarity to said electrode.

6. The apparatus of claim 3 including a third source of periodic pulses of voltage occurring sequentially with the pulses from said first and said second sources, said third source being connected to said grid to apply periodically a pulse of negative voltage thereto.

7. The apparatus of claim 3 in which said tube has a high potential electrode, said first and said second sources being connected to said electrode to apply periodically pulses of negative voltage thereto.

8. An electrical circuit comprising a cathode ray tube having two electron beam control electrodes, a first source of periodic pulses of control voltage and a second source of periodical pulses of control voltage, said first source being connected to both said control electrodes to apply substantially equal voltages of respective opposite polarity simultaneously thereto, said second source being connected to said electrodes to apply substantially equal voltages of respective opposite polarity simultaneously thereto, the periodic voltage from said second source occurring sequentially with the periodic voltages from said first source, the polarity of voltage from said second source applied to any one said electrode being opposite to the polarity of the voltage from said first source.

9. An electrical circuit comprising a cathode ray tube having two electron beam control electrodes, and a conductive coating on the face of said tube, a first source of periodic pulses of control voltage and a second source of periodic pulses of control voltage, said first source being connected to both said control electrodes to apply substantially equal voltages of respective opposite polarity simultaneously thereto, said second source being connected to said electrodes to apply substantially equal voltages of respective opposite polarity simultaneously thereto, the periodic voltage from said second source occurring sequentially with periodic voltages from said first source, the polarity of voltage from said second source applied to any one said electrode being opposite to the polarity from said first source, and a third source of potential, said third source being connected across said face coating and said beam control electrodes.

10. In a television system a cathode ray tube having a screen, an electron deflecting grid mounted within said tube and longitudinally adjacent said screen, the area of said grid being substantially that of said screen, said grid comprising a plurality of electrically separate sections, each section comprising a plurality of electrically conductive elements, and a source of periodic pulses of control voltage to switch consecutively the three colors for a complete color picture, said source being connected to said grid to apply equal voltage pulses of respective opposite polarity simultaneously to said sections thereof.

11. The apparatus of claim 10, in which said screen comprises a plurality of stripes of phosphors for producing respective colors when excited by an electron beam, said elements of said grid being in electron optical alignment respectively with said stripes.

12. The apparatus of claim 10 in which said source is plished by reducing the potential on the grating 20 during presentation of the color on the face of the tube so that the beam will pass through the grating without being attracted to the blue or green plates.

Referring again to the drawing, the output of the sorting circuit may be fed through a suitable phase inverter circuit 56 to provide a square wave pulse of negative polarity during the presentation of the red field. This negative pulse is applied across resistor 57 connected in series in the lead between the source 18 of high voltage and terminal 59 which is connected through suitable resistance, illustrated as a pair of resistors 61 and 62 in parallel, to the blue voltage resistor 41 and the green voltage resistor 42. Thus during the time of the presentation of the red field the negative pulse applied across resistor 57 reduces correspondingly the potential of the blue and green phosphor plates of the structure of the grating tube. With this reduction in potential on these color plates, while maintaining the full accelerating potential from the source 18, the electron beam proceeds through the color plate structure to the face of the tube to excite the red phosphor without being deflected to excite the green and blue phosphors. Thus color contamination is reduced by producing only red excitation without extraneous undesirable green or blue phosphor excitation.

Figure 3:
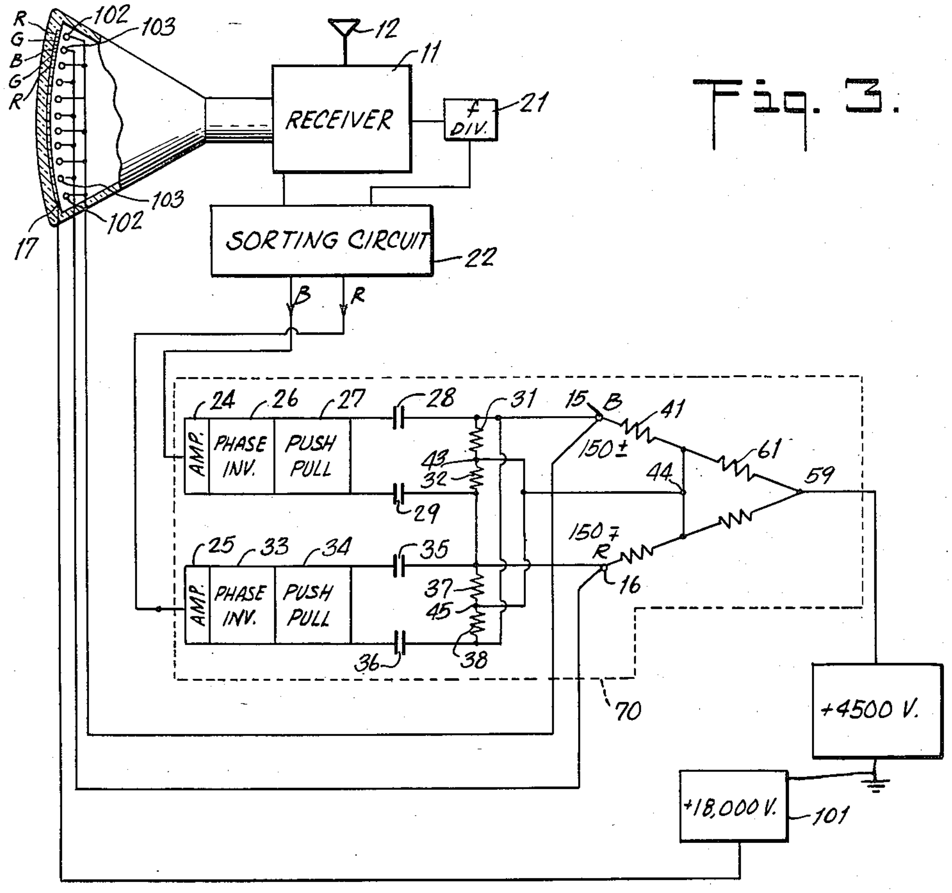
Figure 3 is a diagram similar to Figure 2 but showing the circuit connections in accordance with the invention to be used in a television receiver with a cathode ray tube of the wire grid type.

Referring now to Figure 3, there is shown therein a circuit, similar to Figure 2, for use with the wire grid type tube. As illustrated, the undeflected electron beam strikes a green phosphor and the beam when deflected strikes either a blue or a red phosphor. The two terminals 15 and 16 are respectively associated with blue and red. Also in the wire grid tube shown in Figure 3, a potential exists between the grid structure and the tube face in order to provide an electrostatic cylindrical lens and this potential is not reduced when the beam is undeflected. Since it is unnecessary and undesirable to lower the potential on the grid structure when the beam is undeflected the amplifier and phase inverter 56 is omited as is the resistor 57 and the junction of resistors 61 and 62 is connected directly to the source of high voltage 18. Further a separate source of high voltage 101 is provided this source being connected to the conductive layer 17 on the surface of the phosphors. As indicated in the drawings, the voltage of the source 18 may be 4500 volts and that of the source 101, 18,000 volts. The second anode of the electron gun will, when the voltages indicated are utilized, also be at 4500 volts above ground and the resistors 41 and 42 will have values such that 150 volts will be added or subtracted from the 4500 applied so that when the voltage on the red wires 102 of the grid structure is 4350, that on the blue wires 103 will be 4650, thus providing a 300 volt potential difference between the red and blue grid wires.

With the exceptions above noted the circuit of Figure 3 is identical with that of Figure 2 and its operation is similar. In the operation of this circuit in conjunction with the wire grid tube the potential difference between the conductive layer on the tube face and the grids composed of wires 102 and 103 is constant and in the case illustrated is 13,500 volts.

When the voltage for deflecting the electron beam to the red stripes is applied to the grid wires 102 it is simultaneously applied in inverse polarity to the blue wires 103. That is, when the red wires 102 have a 4650 volt potential applied thereto the blue wires have a 4350 volt potential applied thereto. As a result, under the last stated conditions the electron beam will be deflected toward and strike the red stripes. At the same time, because of the more negative voltage applied to the blue deflection grid wires 103, the electron beam will be repelled from those wires assuring that no electrons therefrom will impinge upon either the green or the blue stripes. Conversely, when the grid wires 102 are provided with a voltage of 4350 volts and the wires 103 with 4650 volts the potential difference will cause the blue wires to be more positive attracting the electron beam toward these wires and causing it to strike the blue stripes and since at this time the grid wires 102 are more negative, no electrons from the beam will strike either the green or blue stripes. During the fields in which green is to appear, the amplifiers 24 and 25 are not energized since no pulses are then provided from the sorting circuit 22 to these amplifiers and both sets of grid wires 102 and 103 are provided with the 4500 volt potential so that no deflection of the electron beam occurs and the beam is simply focussed by the electron lenses upon the green stripes.

Referring now once again to the grating type tube, the possibility of color contamination in that tube may be further reduced if desired by applying the voltage used for creating the desired potential on the respective blue and green plates of the tube to reduce the accelerating potential for the cathode ray tube thus reducing the tendency of the electron beam to continue beyond the blue and green plate structure or grating and thereby preventing excitation of the red phosphor on the face of the tube.

Figure 4:
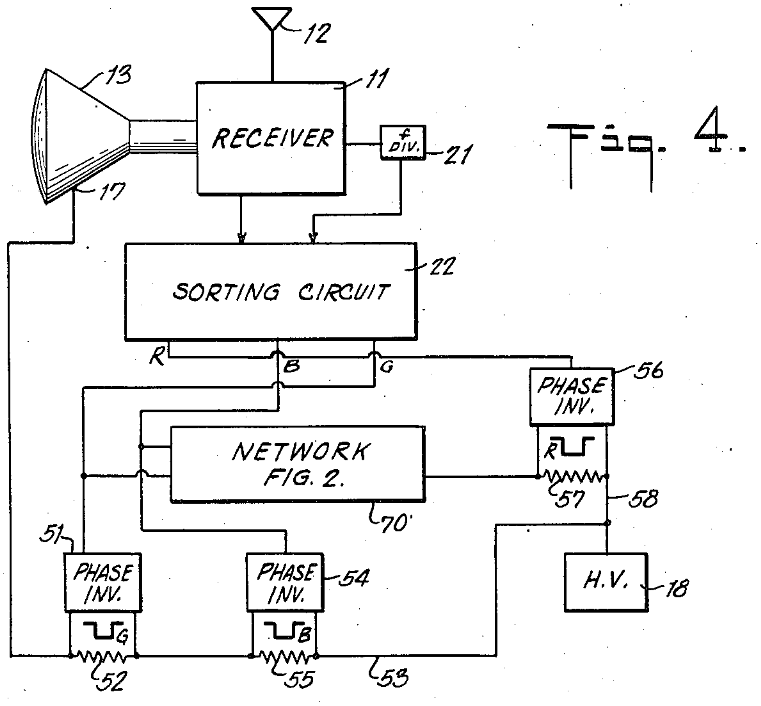
Figure 4 is a diagram of a modification or an alternative circuit adapted to use with the grating tube.

In Figure 4 this added feature for avoidance of color contamination is shown. Essentially the circuit is like that described in Figure 2 with some additional components. In this case the blue and green signals, respectively, are applied to phase inverters 54 and 51 and in turn to the corresponding resistors 55 and 52. The network 70 of Figure 2 is identified in Figure 4 as the block 70.

The square wave corresponding to the blue field is inverted in the phase inverter circuit 54 and applied across resistor 55 in series in the high voltage lead 53 supplying accelerating potential to the terminal 17 of the cathode ray tube 13. Thus a negative square wave pulse is applied across resistor 55 and the effect of this pulse is to reduce the accelerating potential applied to the terminal 17. In this way the accelerating potential for the cathode ray beam in the tube 13 is reduced during the blue field so as to increase the effectiveness of the deflection voltage applied to the blue terminal 15 of the grating 20. Thus the electron beam is deflected to impinge upon the blue plates of the grating 20 and the tendency for stray electrons to proceed through the grating to the face of the tube to excite red phosphors is reduced.

In like manner the square wave pulse corresponding to the green field is inverted in phase inverting circuit 51 and applied across resistor 52 also in series with the high voltage lead 53. In like manner, the accelerating potential applied to the terminal 17 is reduced by the negative pulse during the time that the green field is applied to the cathode ray tube and as before the tendency of stray electrons to pass through the grating and undesirably excite red phosphors is reduced.

Figure 5:
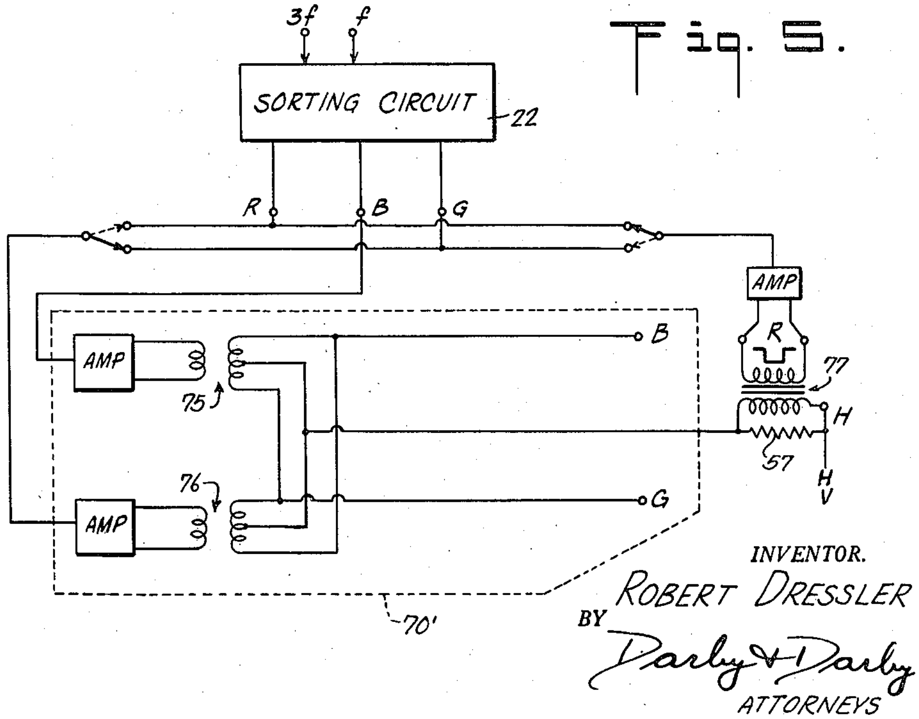
Figure 5 illustrates a second alternative circuit which is adapted particularly to use with a grating tube, but may be readily modified for use with the post deflection focussing tube.

In Figure 5 an alternative arrangement is shown for feeding the square wave pulses to the grating 20 of the grating tube of Figure 2. In this figure the connections for the blue and green signals to the corresponding terminals of the grating 20 are shown as being accomplished by amplifiers and transformers 75 and 76 in the separate stages. In like manner a transformer 77 may be used to apply a negative voltage across resistor 57 in the high voltage lead. The transformers accomplish the desired phase inversion in the application of the respective signals to the appropriate terminals of the grating to avoid color contamination. Also the transformers provide isolation and permit the grating 20 to "float" at second anode potential. The phase inversion and resistance networks are not required if transformers 75 and 77 are used.

The arrangement of Figure 5 may also be utilized with the wire grid tube but when so utilized the transformer 77 and the resistor 57 would be omitted and the high voltage terminal connected directly to the junction of the center taps on the secondaries of the transformers 75 and 76.

It will be noted that in accordance with the invention connected to said grid to apply a first series of equal control voltage pulses of respective opposite polarity simultaneously to said sections and a second series of equal control voltage pulses of respective opposite polarity simultaneously to said sections, the pulses in said first series occurring sequentially with those of said second series and of respective opposite polarity with respect thereto.

References Cited in the file of this patent

UNITED STATES PATENTS

| | | |
|---|---|---|
| Re. 23,672 | Okoliscanyi | June 23, 1953 |
| 2,446,791 | Schroeder | Aug. 10, 1948 |
| 2,650,264 | Weimer | Aug. 25, 1953 |
| 2,660,684 | Parker | Nov. 24, 1953 |
| 2,721,293 | Gow | Oct. 18, 1955 |